US012722614B2

(12) United States Patent
Dueckmann et al.

(10) Patent No.: US 12,722,614 B2
(45) Date of Patent: Sep. 1, 2026

(54) ELECTRO-PNEUMATIC HAND BRAKE SYSTEM

(71) Applicant: ZF CV Systems Europe BV, Brussels (BE)

(72) Inventors: Rudolf Dueckmann, Isernhagen (DE); Maciej Semeniuk, Wroclaw (PL); Marcin Biernat, Bozkow (PL)

(73) Assignee: ZF CV Systems Europe BV, Brussels (BE)

( * ) Notice: Subject to any disclaimer, the term of this patent is extended or adjusted under 35 U.S.C. 154(b) by 676 days.

(21) Appl. No.: 18/329,182

(22) Filed: Jun. 5, 2023

(65) Prior Publication Data

US 2023/0311831 A1 Oct. 5, 2023

Related U.S. Application Data

(63) Continuation of application No. PCT/EP2020/087359, filed on Dec. 21, 2020.

(51) Int. Cl.
*B60T 13/68* (2006.01)
*B60T 13/38* (2006.01)
*B60T 17/08* (2006.01)

(52) U.S. Cl.
CPC .......... *B60T 13/683* (2013.01); *B60T 13/385* (2013.01); *B60T 17/083* (2013.01)

(58) Field of Classification Search
CPC .... B60T 13/385; B60T 13/665; B60T 13/683; B60T 17/083; B60T 8/3235
See application file for complete search history.

(56) References Cited

U.S. PATENT DOCUMENTS

2008/0030068 A1 2/2008 Bensch et al.
2010/0025141 A1 2/2010 Bensch et al.
(Continued)

FOREIGN PATENT DOCUMENTS

CN 101117115 A 2/2008
CN 108263367 A 7/2018
(Continued)

OTHER PUBLICATIONS

English translation and Office action of the Chinese patent office dated May 9, 2025 in corresponding Chinese application 202080107465.0.

(Continued)

*Primary Examiner* — Robert A. Siconolfi
*Assistant Examiner* — Mahbubur Rashid
(74) *Attorney, Agent, or Firm* — Walter Ottesen, P.A.

(57) ABSTRACT

An electro-pneumatic hand brake system is for a vehicle with spring-loaded brakes. The system includes a pneumatic relay valve, a bistable solenoid valve for controlling the relay valve and a control unit for controlling the bistable solenoid valve. An outlet of the relay valve is connected to ports for the spring-loaded brakes. An inlet of the bistable solenoid valve is provided for connecting to a line carrying ventilation pressure. A self-retaining switching valve with a control input is provided before the inlet of the bistable solenoid valve. The self-retaining switching valve can be moved against the force of a restoring element from a blocking position into a flow-through position when there is sufficient pressure at its control input. An outlet of the self-retaining switching valve is connected to the inlet of the bistable solenoid valve.

16 Claims, 3 Drawing Sheets

(56) References Cited

U.S. PATENT DOCUMENTS

| | | | |
|---|---|---|---|
| 2012/0173112 | A1 | 7/2012 | Bensch et al. |
| 2022/0194340 | A1 | 6/2022 | Schuppert et al. |

FOREIGN PATENT DOCUMENTS

| | | | | | |
|---|---|---|---|---|---|
| CN | 110446634 | A | * | 11/2019 | ............ B60T 15/203 |
| DE | 10 2005 058 799 | A1 | | 6/2007 | |
| DE | 102019113753 | A1 | * | 11/2020 | ............ B60T 13/665 |
| EP | 2998177 | A1 | * | 3/2016 | .............. B60T 13/36 |
| EP | 2331377 | B1 | * | 4/2020 | .............. B60T 17/04 |
| WO | 2021/058234 | A1 | | 4/2021 | |

OTHER PUBLICATIONS

Communication pursuant to Article 94(3) EPC of the European Patent Office dated Mar. 17, 2025 for European patent application 20838494.1 on which this application is based.

International Search Report of the European Patent Office dated Sep. 16, 2021 for international application PCT/EP2020/087359 on which this application is based.

Written Opinion of the International Searching Authority dated Sep. 16, 2021 for international application PCT/EP2020/087359 on which this application is based.

* cited by examiner

ELECTRO-PNEUMATIC HAND BRAKE SYSTEM

CROSS-REFERENCE TO RELATED APPLICATIONS

This application claims priority of international patent application no. PCT/EP2020/087359, filed Dec. 21, 2020, the entire content of which is incorporated herein by reference.

TECHNICAL FIELD

The disclosure relates to an electro-pneumatic hand brake system. In particular, it is an electro-pneumatic hand brake system including a pneumatic relay valve, a bistable solenoid valve for controlling the relay valve and a control unit for controlling the bistable solenoid valve, wherein an outlet of the relay valve is connected to ports for the spring-loaded brakes, and wherein an inlet of the bistable solenoid valve is provided for connecting to a line carrying ventilation pressure.

BACKGROUND

Modern commercial vehicles have a pneumatic brake installation with an electronic brake system. The pneumatic brake installation includes spring-loaded brakes used as locking brakes. These are also known as parking brakes. The parking brakes act by spring force and can be released by the ventilation of spring brake cylinders or locked by bleeding them.

The spring brake cylinders can be combined with service brake cylinders so that the spring-loaded brakes and service brakes act on the same brake pistons. Appropriate constructional measures can be taken to avoid mechanical overloading of the brake pistons by the addition of braking forces from the service brakes and the spring brakes. Should the service brakes be applied while the parking brakes are engaged, the spring brake cylinders are ventilated at the same time to avoid the addition of braking forces.

Valves for regulating the brake pressure are controlled electronically via the electronic brake system. For safety reasons, pneumatic control of the valves regulating the brake pressure is also provided.

The parking brakes are also controlled electronically. By actuating a solenoid valve, the ventilation or bleeding of the spring brake cylinders is regulated. For safety reasons, the solenoid valve must always assume a unique switching position, which must be maintained in the event of a power supply failure. The solenoid valve is therefore realized as a bistable solenoid valve.

The bistable solenoid valve can be part of a subsystem, designated here as the electro-pneumatic hand brake system. The electrical part of the electro-pneumatic hand brake system can be a subsystem of the electronic brake system. The electro-pneumatic hand brake system may be provided with a dedicated electronic control unit. However, the latter can also be integrated in a brake control unit or another control unit.

The pneumatic part of the electro-pneumatic hand brake system of a motor vehicle is typically connected to a brake circuit III, while brake circuits I and II include the service brakes. Brake circuit III usually also supplies a trailer with supply pressure.

Brake circuit I and II, on one hand, and brake circuit III, on the other, are connected to each other via a so-called bleed back function. If the pressure drops in one of the brake circuits I and II, the pressure in brake circuit III also drops, so that the spring brake cylinders are automatically bled and the spring-loaded brakes take effect. By taking advantage of the bleed back function, the parking brakes can be activated by the operator of the vehicle applying the service brakes several times, thus releasing pressure in the brake circuits I and II, in particular when the engine is switched off or the generation of compressed air is stopped.

If the previously described case occurs during travel, the bistable solenoid valve is in its travel position. This means that even after the vehicle has come to a standstill, the spring brake cylinders are ventilated and the parking brakes are released as soon as the pressure in brake circuit III is sufficiently high again. If the vehicle is standing on an inclined surface, it may start to roll. Depending on the surroundings, this can lead to dangerous situations, for example under the following conditions:

- the electrical system continues to fail or is malfunctioning. The operator keeps the engine running so that compressed air continues to be delivered and the pressure in the brake circuits increases again.
- the operator had turned off the engine before reducing the pressure in brake circuit III by applying the service brakes and actuating the bleed back function. After some time, the operator restarts the engine in order to activate the ventilation in the cab. The pressure in the brake circuits increases again.
- the operator leaves the cab with the engine running in order to check the electro-pneumatic hand brake.
- the operator leaves the vehicle. A mechanic starts the engine to heat the cab.

In all of these situations the vehicle may start to move because the parking brakes are ventilated again. This leads to unintentional vehicle movement. The situations described above are an incomplete list of examples. Other situations with a similar hazard potential are possible. In all cases, the cause is the still open position of the bistable solenoid valve in the electro-pneumatic hand brake system.

SUMMARY

An object of the present disclosure is to provide a system by which the dangerous situations described above can be avoided.

To achieve the above object, the electro-pneumatic hand brake system has a self-retaining switching valve provided with a control input arranged before the inlet of the bistable solenoid valve, wherein a) the self-retaining switching valve can be moved against the force of a restoring element from a blocking position into a flow-through position when there is sufficient pressure at its control input, and b) an outlet of the self-retaining switching valve is connected to the inlet of the bistable solenoid valve, and c) the control input of the self-retaining switching valve is also connected to a signal line via which a signal pressure can be fed to the control input as a control pressure at least for a short time, and d) the self-retaining switching valve in its flow-through position connects its outlet with its inlet, and e) the self-retaining switching valve in its blocking position connects its outlet with a bleed outlet.

Accordingly, the self-retaining switching valve is arranged upstream of the bistable solenoid valve. In this context, "self-retaining" means that in the flow-through position and with sufficient pressure at the inlet and/or outlet, the switching valve retains its flow-through position regardless of the pressure at the control input. After the switching valve has assumed its blocking position, sufficient pressure must be present at the control input in order to move the switching valve back into the flow-through position. Once the flow-through position has been attained, the pressure at the control input can decrease again. The switching valve is then independent of the pressure at the control input. The self-retaining switching valve thus prevents ventilation of the spring brake cylinder, even when the bistable solenoid valve is still in the flow-through position.

The control input of the self-retaining switching valve can be controlled in different ways. For example, a brake system line carrying a supply pressure can be connected to the control input of the self-retaining switching valve via a line. This line is switched through by a solenoid valve provided that electrical energy is available and/or the solenoid valve is controlled by a control unit. The activation of the solenoid valve via the control unit can be triggered by auxiliary conditions implemented in the software of the control unit or selectively by the operator.

In a further aspect of the disclosure, the self-retaining switching valve can assume its blocking position as soon as the pressure at its outlet falls below a limit value. Here the self-retaining function of the switching valve is linked to the pressure at the outlet of the switching valve. In particular, the limit value is 1.2 to 2.5 bar, preferably 1.5 bar.

In a further aspect of the disclosure, the bleed outlet of the self-retaining switching valve can be connected to a bleed outlet of the bistable solenoid valve via a first bleed line and a second bleed line connected thereto. As a result, no dedicated bleed outlet is required. The two ventilation lines can also be different sections of a single bleed line.

In a further aspect of the disclosure, the first bleed line can be provided with a throttle. This prevents sudden bleeding when changing from the flow-through position to the blocking position of the self-retaining switching valve. In this way, feedback can also be avoided.

In a further aspect of the disclosure, the first bleed line and the second bleed line can be connected via a third bleed line to a bleed outlet of the relay valve. In this way, a common bleed system can be utilized.

In a further aspect of the disclosure, the third bleed line or the second bleed line can be connected to a bleed. This applies in particular if the first bleed line is equipped with a throttle.

In a further aspect of the disclosure, the input of the self-retaining switching valve can be connected to an input of the relay valve. This allows both inputs to be connected to a common line carrying a ventilation pressure. The ventilation pressure preferably corresponds to a pressure in brake circuit III, which is also designated as the parking brake circuit, or to a supply pressure in the vehicle braking system.

In a further aspect of the disclosure, the self-retaining switching valve can be a 3/2-way valve. Such valves are well-known, widely used and economical.

In a further aspect of the disclosure, the bistable solenoid valve can be a 3/2-way valve. This type of valve is also widely used and economical.

In a further aspect of the disclosure, an outlet of the bistable solenoid valve can be connected to a control input of the relay valve.

In a further aspect of the disclosure, an electro-magnetic switching valve can be switched between the output of the bistable solenoid valve and the control input of the relay valve, it being possible for the switching valve to switch from a flow-through position to a blocking position. The switching valve is preferably a 2/2-way valve. With the electronic switching valve it is possible to modulate the pressure applied to the control input of the relay valve. In this case, the bistable solenoid valve is only indirectly connected to the control input of the relay valve, that is, by the intermediate connection of the electromagnetic switching valve.

In a further aspect of the disclosure, the electromagnetic switching valve without current supply can be in the flow-through position. The switching valve is monostable and, in the case of a power failure for example, assumes the flow-through position.

In a further aspect of the disclosure, a shuttle valve can be connected between the outlet of the bistable solenoid valve and the control input of the relay valve, wherein a) an outlet of the shuttle valve is connected to the control input of the relay valve, and
b) a first inlet of the shuttle valve is directly or indirectly connected to the outlet of the bistable solenoid valve, and
c) a second inlet of the shuttle valve is connected to a pressure inlet carrying a service brake pressure.

At this point the shuttle valve acts as an overload protection for service brakes, which are also equipped with spring-loaded brake cylinders. Via the shuttle valve, the spring-loaded brake cylinders are increasingly ventilated with increasing service brake pressure, so that a mechanical overload of brake pistons and/or other brake parts is avoided.

In a further aspect of the disclosure, the bleed outlet of the self-retaining switching valve can bleed directly into the atmosphere. In addition, a throttle can be provided in the self-retaining switching valve in the region of the bleed outlet.

The subject matter of the disclosure also includes an electronic braking system for a vehicle with spring-applied brakes and with an electro-pneumatic hand brake system. The electro-pneumatic hand brake system according to the disclosure is preferably used in combination with the electronic brake system.

Finally, the subject matter of the disclosure is also a vehicle with a pneumatic braking installation, spring-loaded brakes and an electronic brake system.

BRIEF DESCRIPTION OF DRAWINGS

The invention will now be described with reference to the drawings wherein.

DETAILED DESCRIPTION

Figure 1:
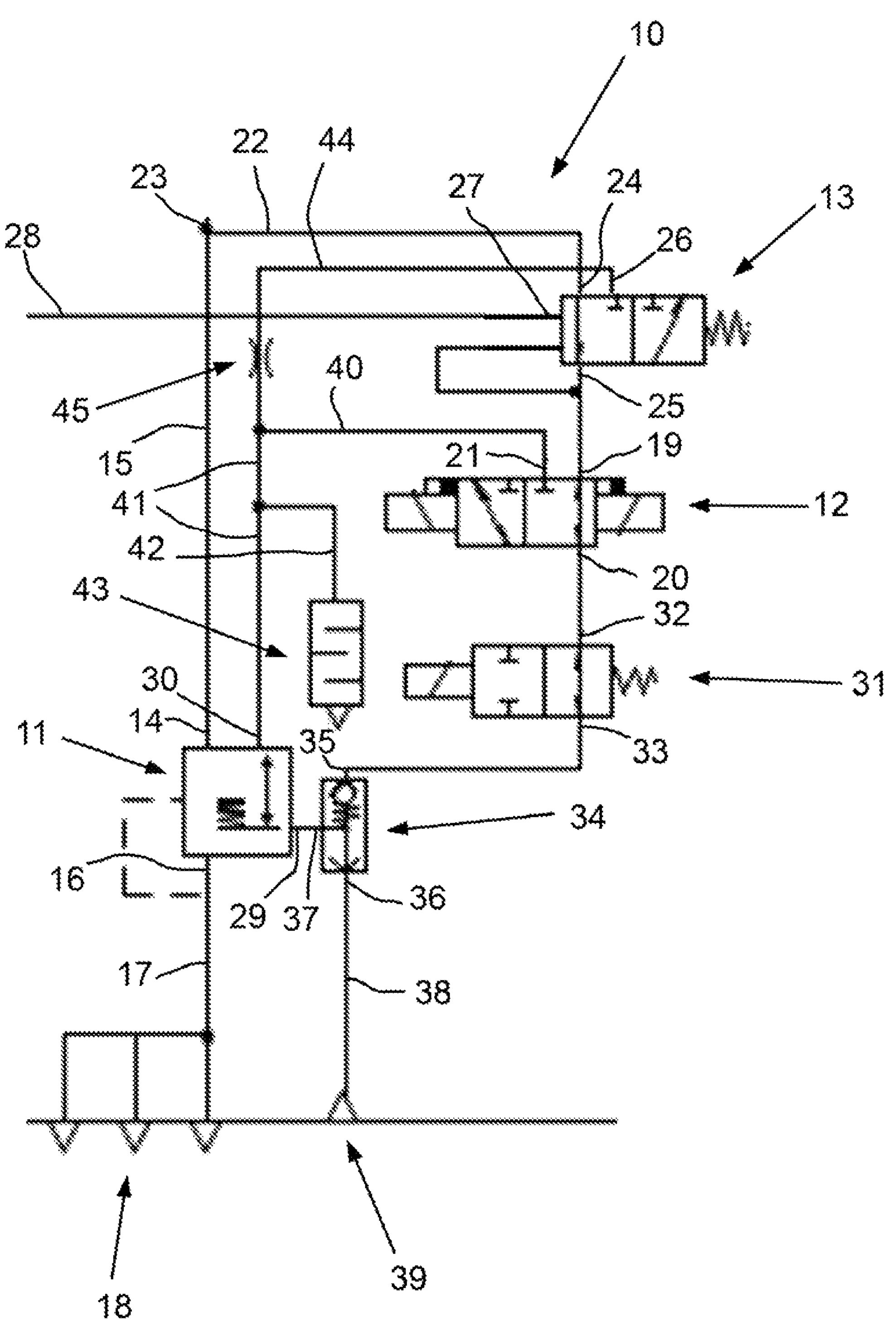
FIG. 1 shows a circuit diagram of an electro-pneumatic hand brake system, in the driving position.

FIG. 1 shows a circuit diagram of an electro-pneumatic hand brake system 10 for a vehicle (not shown) with spring-loaded brakes. The hand brake system 10 is preferably a subsystem of an electronic brake system for a pneumatic brake installation. The vehicle is preferably a motor vehicle.

Important components of the hand brake system 10 are a pneumatic relay valve 11, a bistable solenoid valve 12 and a self-retaining pneumatic switching valve 13.

The relay valve 11 is connected with an inlet 14 to a line 15 carrying ventilation pressure. From an outlet 16 of the relay valve 11 a line 17 leads to ports 18 for spring brake cylinders (not shown). With relay valve 11 switched through, the spring brake cylinders are ventilated or at least can be ventilated.

Figure 2:
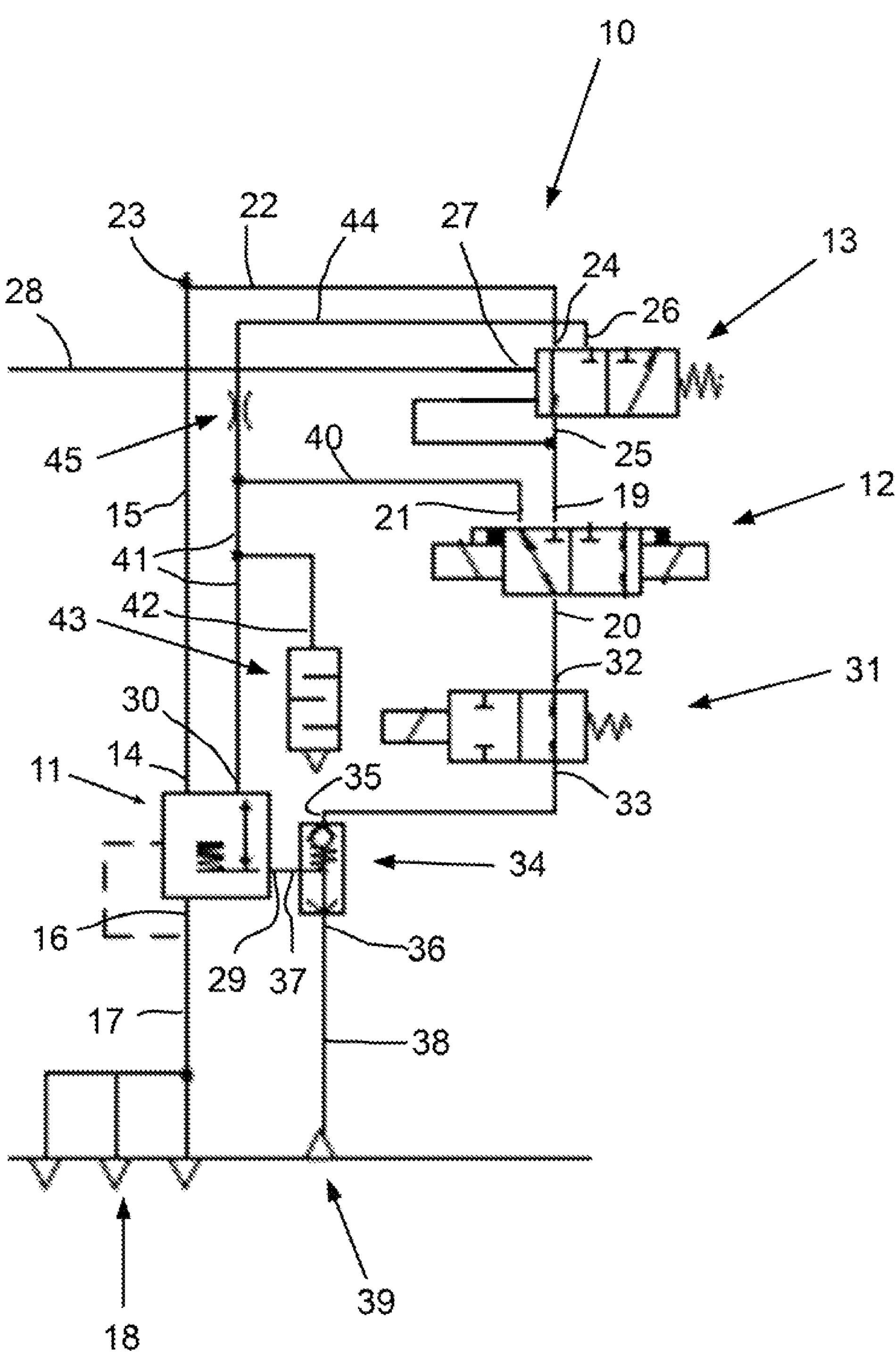
FIG. 2 shows the circuit diagram of FIG. 1, but in the parking position; and, FIG. 3 shows a slightly supplemented circuit diagram, as shown in FIG. 1, in a malfunction position following a driving position.
Figure 3:
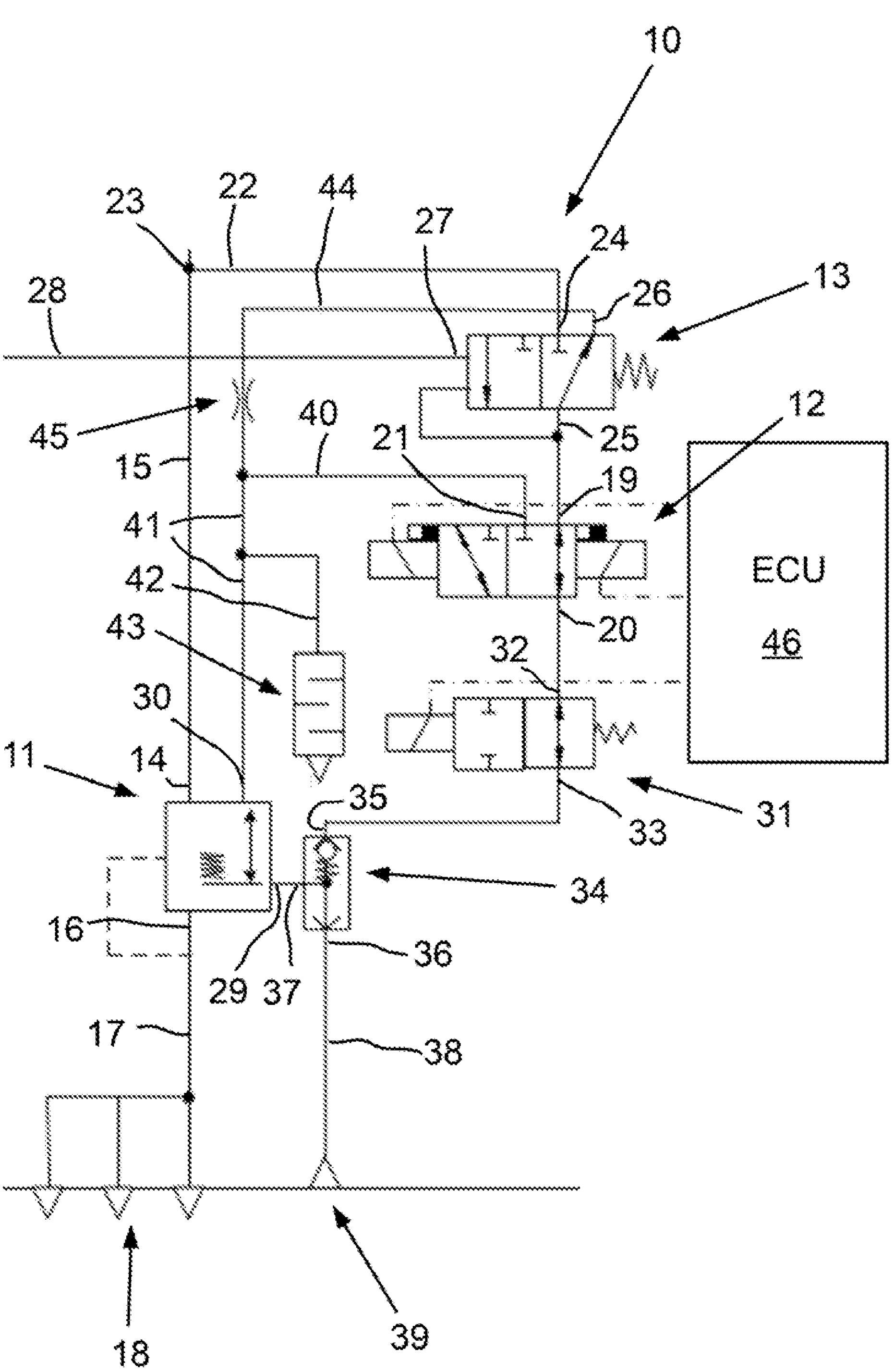

The bistable solenoid valve 12 is preferably a 3/2-way valve and is electromagnetically switchable between the flow-through position shown in FIGS. 1 and 3 and the blocking position shown in FIG. 2. In the flow-through position, inlet 19 and outlet 20 are connected. In the blocking position the outlet 20 is connected to a bleed outlet 21.

A second line 22 carrying ventilation pressure is indirectly connected to the inlet 19. The lines 15 and 22 carrying ventilation pressure can be connected to one another via a junction 23. The ventilation pressure preferably corresponds to the supply pressure in a brake circuit provided for the hand brake system 10. This is also known as the parking brake circuit. Lines 15, 22 are connected to ports (not shown) of the parking brake circuit.

The self-retaining, pneumatic switching valve 13 has inlet 24, outlet 25, bleed outlet 26 and control input 27 and is preferably realized as a 3/2-way valve. In the flow-through position, the switching valve 13 connects the line 22 with the inlet 19 of the bistable solenoid valve 12. In the blocking position of switching valve 13, the outlet 25 is switched to the bleed outlet 26, see FIG. 3. As long as there is a pressure above a limit value at outlet 25, the switching valve 13 remains in the flow-through position against the force of a restoring element and is self-retaining there. The limit value is approximately 1.2 to 2.5 bar, preferably 1.5 bar.

The control input 27 is connected to a line 28, which can be supplied with control pressure in a manner not shown, at least for a short time, and thus has the function of a signal line. As control pressure, for example, reserve pressure can be fed into line 28 at a suitable point via a switchable valve (not shown). The valve can be switched manually, pneumatically or electromagnetically, preferably either by an operator or automatically under defined conditions.

The pressure applied to the outlet 20 of the solenoid valve 12 feeds a control input 29 of the relay valve 11. As long as solenoid valve 12 and switching valve 13 are each in the flow-through position and ventilation pressure is present in each of the lines 15, 22, relay valve 11 is switched through, so that the spring brake cylinder is ventilated via the ports 18.

If there is no pressure at control input 29, the outlet 16 of the relay valve is connected to its bleed outlet 30. The spring brake cylinders are then bled via ports 18 and the relay valve 11, thus ensuring that the parking brakes are activated.

To modulate the pressure between bistable solenoid valve 12 and relay valve 11, an electro-magnetic switching valve 31 is provided, which is preferably a 2/2-way valve and is in the flow-through position without current supply, as shown in all three figures. With the electro-magnetic switching valve 31, the ventilation of the spring brake cylinders can be controlled in steps. In the through-flow position shown, inlet 32 and outlet 33 of the switching valve 31 are connected to each other.

Located here between the electromagnetic switching valve 31 and the relay valve 11 is a shuttle valve 34, also known as an OR valve, which has two inlets 35, 36 and one outlet 37. The inlet 35 is connected to the outlet 33 of the switching valve 31, outlet 37 to the control input 29 of the relay valve 11. The other inlet 36 is connected via a line 38 to a port 39, which is supplied with service brake pressure. When a service brake is actuated, service brake pressure enters the hand brake system 10 via port 39. The higher of the pressures applied to inlets 35, 36 is fed in each case to the control input 29 of the relay valve 11 via shuttle valve 34. This allows the spring brake cylinders to be ventilated depending on the actuation of the service brakes, which prevents mechanical overloading of the brakes.

In the driving position shown in FIG. 1, all four valves 11, 12, 13, 31 are in the flow-through position. The spring-loaded brake cylinders are ventilated with pressure via ports 18.

In the parking position pursuant to FIG. 2, the bistable solenoid valve 12 is in the blocking position, while switching valve 13 and switching valve 31 are preferably in the flow-through position. Due to the blocking position of solenoid valve 12, the pressure at the outlet 20 is reduced via the bleed outlet 21. For this purpose, the bleed outlet 21 is connected to a bleed 43 via a bleed line 40 and further bleed lines 41, 42. Bleed line 41 extends up to the bleed outlet 30 of the relay valve 11, so that bleed 43 is also connected to bleed outlet 30.

The bleed outlet 26 of the self-retaining switching valve 13 is connected to bleed line 40 and/or bleed line 41 via a bleed line 44. This also creates a connection from the bleed outlet 26 of the self-retaining switching valve 13 to the bleed 43.

Here the bleed line 44 is provided with a throttle 45. Accordingly, when the outlet 25 is bled via bleed outlet 26 in the blocking position of switching valve 13, the pressure in the bleed line 44 adjacent to the switching valve 13 is higher than in bleed line 41.

In another embodiment (not shown), the bleed outlet 26 opens to the atmosphere. Line 44 is not present. A throttle can be integrated in the switching valve 13 so that the pressure at outlet 25 is not reduced too much when bleeding.

In FIG. 3 a control unit (ECU) 46 is additionally shown. This is either provided specifically for the hand brake system 10 or is a component of a brake control unit (not shown) or another electronic control unit in the associated vehicle. Here the control unit 46 is used to control the functions of the bistable solenoid valve 12 and the electromagnetic switching valve 31. The switching status according to FIG. 3 proceeds from the following situation:

The hand brake system 10 is in the driving position, as shown in FIG. 1. Solenoid valve 12 and switching valves 13, 31 are in the flow-through position. The operator has been informed of a malfunction of the electronic braking system or the electronic braking system has failed completely or partially. The parking brakes can no longer be actively applied due to the failure. For safety reasons, in such a situation the operator should use the service brakes to bring the vehicle to a standstill and then apply the service brakes several times to reduce the pressure in the service brake circuits so that a bleed back function also reduces the pressure in the parking brake circuit. This will bleed the spring brake cylinders.

There is also a pressure drop in the region of outlet 25 of the self-retaining switching valve 13. This causes the switching valve 13 to move from its flow-through position to the blocking position as shown in FIG. 3. There is also no pressure at control input 27, since pressure is only fed in line 28 upon manual actuation or automatic actuation dependent on specific conditions. This means that the hand brake system cannot automatically ventilate the spring brake cylinders and thus release the parking brakes as soon as sufficient supply pressure is available again. Instead, a pressure impulse at control input 27 via line 28 is first required to ventilate the parking brake cylinders again.

In the hand brake system 10, the self-retaining switching valve 13 has the function of a safety device in case the situation described above arises. An unintentional release of the parking brakes by restarting the engine with a corresponding build-up of the supply pressure is avoided. The parking brakes remain active until control input 27 is activated with pressure via line 28, in particular by deliberate manual intervention or automatically under defined conditions.

Control unit 46 is connected to a hand brake lever (not shown) for the operator. When the hand brake lever is actuated, the control unit 46 receives the command to activate or deactivate the parking brakes.

It is understood that the foregoing description is that of the preferred embodiments of the invention and that various changes and modifications may be made thereto without departing from the spirit and scope of the invention as defined in the appended claims.

LIST OF REFERENCE NUMBERS (PART OF THE DESCRIPTION)

10 electro-pneumatic hand brake system
11 relay valve
12 bistable solenoid valve
13 self-retaining switching valve
14 relay valve inlet
15 line
16 relay valve outlet
17 line
18 ports
19 solenoid valve inlet
20 solenoid valve outlet
21 solenoid valve bleed outlet
22 line
23 junction
24 self-retaining switching valve inlet
25 self-retaining switching valve outlet
26 self-retaining switching valve bleed outlet
27 self-retaining switching valve control input
28 line
29 relay valve control input
30 relay valve bleed outlet
31 electromagnetic switching valve
32 self-retaining switching valve inlet
33 self-retaining switching valve outlet
34 shuttle valve
35 shuttle valve inlet
36 shuttle valve inlet
37 shuttle valve outlet
38 line
39 port
40 bleed line
41 bleed line
42 bleed line
43 bleed
44 bleed line
45 throttle
46 control unit

The invention claimed is:

1. An electro-pneumatic hand brake system for a vehicle with spring-loaded brakes, the electro-pneumatic hand brake system comprising:

a pneumatic relay valve having a relay valve outlet;

a bistable solenoid valve for controlling said relay valve;

a control unit for controlling the bistable solenoid valve;

a plurality of ports associated with the spring-loaded brakes;

said relay valve outlet being connected to said plurality of ports;

said bistable solenoid valve having an inlet for connecting to a line carrying ventilation pressure;

a self-retaining switching valve having a control input provided before said inlet of said bistable solenoid valve, a self-retaining switching valve inlet, and a self-retaining switching valve outlet; wherein:

a) said self-retaining switching valve is moveable against a force of a restoring element from a blocking position into a flow-through position when there is sufficient pressure at said control input to move said self-retaining switching valve back into the flow-through position;

b) said self-retaining switching valve outlet is connected to said inlet of the bistable solenoid valve;

c) said control input of said self-retaining switching valve is also connected to a signal line via which a signal pressure is feedable to said control input as a control pressure at least for a period of time;

d) said self-retaining switching valve in said flow-through position connects said self-retaining switching valve outlet to said self-retaining switching valve inlet; and, e) said self-retaining switching valve in said blocking position connects said self-retaining switching valve outlet with a self-retaining switching valve bleed outlet.

2. The system of claim 1, wherein said self-retaining switching valve is configured to assume said blocking position as soon as a pressure at said self-retaining switching valve outlet falls below a limit value.

3. The system of claim 1 further comprising:

a first bleed line;

a second bleed line;

said bistable solenoid valve having a bistable solenoid valve bleed outlet;

said self-retaining switching valve bleed outlet being connected to said bistable solenoid valve bleed outlet via said first bleed line and said second bleed line.

4. The system of claim 3, wherein said first bleed line is provided with a throttle.

5. The system of claim 3, wherein said first bleed line and said second bleed line are connected via a third bleed line to a bleed outlet of said pneumatic relay valve.

6. The system of claim 5, wherein said third bleed line or the second bleed line is connected to a pneumatic silencer.

7. The system of claim 1, wherein said control input of said self-retaining switching valve is connected to an input of said pneumatic relay valve.

8. The system of claim 1, wherein said self-retaining switching valve is a 3/2-way shuttle valve.

9. The system of claim 1, wherein said bistable solenoid valve is a 3/2-way valve.

10. The system of claim 1, wherein said bistable solenoid valve has a bistable solenoid valve outlet connected to a relay valve control input of said pneumatic relay valve.

11. The system of claim 10 further comprising:

an electro-magnetic switching valve connected between said bistable solenoid valve output and said relay valve control input; and, said electro-magnetic switching valve configured to switch from a flow-through position to a blocking position.

12. The system of claim 11, wherein said electro-magnetic switching valve without current supply is in said flow-through position.

13. The system of claim 10 further comprising:

a shuttle valve connected between said bistable solenoid valve outlet and said relay valve control input; wherein:

a) said shuttle valve has a shuttle valve outlet connected to said relay valve control input;

b) said shuttle valve has a first inlet directly or indirectly connected to said bistable solenoid valve outlet; and, c) said shuttle valve has a second shuttle valve inlet connected to c) a pressure inlet carrying a service brake pressure.

14. The system of claim 1, wherein said self-retaining switching valve has a bleed outlet configured to bleed directly into an atmosphere.

15. An electronic braking system for a vehicle with spring-applied brakes comprising:

an electro-pneumatic hand brake system including a pneumatic relay valve having a relay valve outlet, a bistable solenoid valve for controlling said relay valve;

said electro-pneumatic hand brake system further including a control unit for controlling the bistable solenoid valve and a plurality of ports associated with the spring-loaded brakes;

said relay valve outlet being connected to said plurality of ports;

said bistable solenoid valve having an inlet for connecting to a line carrying ventilation pressure;

said electro-pneumatic hand brake system further including a self-retaining switching valve having a control input provided before said inlet of said bistable solenoid valve, a self-retaining switching valve inlet, and a self-retaining switching valve outlet; wherein:

a) said self-retaining switching valve is moveable against a force of a restoring element from a blocking position into a flow-through position when there is sufficient pressure at said control input to move said self-retaining switching valve back into the flow-through position;

b) said self-retaining switching valve has a self-retaining switching valve outlet connected to said inlet of the bistable solenoid valve;

c) said control input of said self-retaining switching valve is also connected to a signal line via which a signal pressure is feedable to said control input as a control pressure at least for a period of time;

d) said self-retaining switching valve in said flow-through position connects said self-retaining switching valve outlet to said self-retaining switching valve inlet; and, e) said self-retaining switching valve in said blocking position connects said self-retaining switching valve outlet with a self-retaining switching valve bleed outlet.

16. A vehicle comprising:

a pneumatic brake installation;

spring-loaded brakes;

an electronic braking system having an electro-pneumatic hand brake system including a pneumatic relay valve having a relay valve outlet, a bistable solenoid valve for controlling said relay valve;

said electro-pneumatic hand brake system further including a control unit for controlling the bistable solenoid valve and a plurality of ports associated with the spring-loaded brakes;

said relay valve outlet being connected to said plurality of ports;

said bistable solenoid valve having an inlet for connecting to a line carrying ventilation pressure;

said electro-pneumatic hand brake system further including a self-retaining switching valve having a control input provided before said inlet of said bistable solenoid valve, a self-retaining switching valve inlet, and a self-retaining switching valve outlet; wherein:

a) said self-retaining switching valve is moveable against a force of a restoring element from a blocking position into a flow-through position when there is sufficient pressure at said control input to move said self-retaining switching valve back into the flow-through position;

b) said self-retaining switching valve has a self-retaining switching valve outlet connected to said inlet of the bistable solenoid valve;

c) said control input of said self-retaining switching valve is also connected to a signal line via which a signal pressure is feedable to said control input as a control pressure at least for a period of time;

d) said self-retaining switching valve in said flow-through position connects said self-retaining switching valve outlet to said self-retaining switching valve inlet; and, e) said self-retaining switching valve in said blocking position connects said self-retaining switching valve outlet with a self-retaining switching valve bleed outlet.

* * * * *